United States Patent
Dafinger et al.

(10) Patent No.: US 10,363,524 B2
(45) Date of Patent: Jul. 30, 2019

(54) PROCESS FOR REMOVING OXYGEN FROM A GAS MIXTURE COMPRISING HYDROCARBON AND OXYGEN

(71) Applicant: Wacker Chemie AG, Munich (DE)

(72) Inventors: Willibald Dafinger, Roehrnbach (DE); Marc Eckert, Kastl (DE); Guenther Rudolf, Muehldorf (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/739,962

(22) PCT Filed: Jul. 8, 2016

(86) PCT No.: PCT/EP2016/066317
§ 371 (c)(1),
(2) Date: Dec. 26, 2017

(87) PCT Pub. No.: WO2017/009243
PCT Pub. Date: Jan. 19, 2017

(65) Prior Publication Data
US 2018/0185787 A1 Jul. 5, 2018

(30) Foreign Application Priority Data
Jul. 13, 2015 (DE) .......... 10 2015 213 030

(51) Int. Cl.
*B01D 53/86* (2006.01)
*B01J 23/52* (2006.01)
*B01J 35/00* (2006.01)
*B01J 35/02* (2006.01)
*B01J 37/02* (2006.01)

(52) U.S. Cl.
CPC .......... *B01D 53/8671* (2013.01); *B01J 23/52* (2013.01); *B01J 35/008* (2013.01); *B01J 35/023* (2013.01); *B01J 35/026* (2013.01); *B01J 37/0201* (2013.01); *B01D 2255/102* (2013.01); *B01D 2255/106* (2013.01); *B01D 2255/1023* (2013.01); *B01D 2255/90* (2013.01); *B01D 2256/24* (2013.01); *B01D 2257/104* (2013.01)

(58) Field of Classification Search
CPC .. B01D 53/46; B01D 53/86; B01D 2255/102; B01D 2255/106; B01D 2256/24; B01D 2257/104; B01J 8/00; B01J 19/00; B01J 23/40; B01J 23/52; B01J 2208/00; B01J 2219/00002; B01J 2219/00759; C07C 67/04; C07C 67/62
See application file for complete search history.

(56) References Cited

U.S. PATENT DOCUMENTS

| | | | |
|---|---|---|---|
| 3,056,646 A | 10/1962 | Andersen | |
| 4,093,703 A | 6/1978 | Buechner et al. | |
| 6,579,824 B1 | 6/2003 | Herzog et al. | |
| 9,561,997 B2 * | 2/2017 | Dafinger | C07C 67/05 |
| 2010/0048972 A1 | 2/2010 | Sun et al. | |
| 2010/0261603 A1 * | 10/2010 | Hagemeyer | B01J 23/44 502/339 |
| 2013/0108531 A1 | 5/2013 | Mitariten | |
| 2013/0172603 A1 * | 7/2013 | Hagemeyer | B01J 21/066 560/261 |
| 2017/0341023 A1 * | 11/2017 | Schultheiss | B01J 23/52 |

FOREIGN PATENT DOCUMENTS

| | | |
|---|---|---|
| DE | 19755023 A1 | 6/1999 |
| DE | 102014223759 A1 | 5/2016 |
| DE | 102014224470 A1 | 6/2016 |
| EP | 0499087 A1 | 8/1992 |
| EP | 0545559 A2 | 6/1993 |
| EP | 0603767 A1 | 6/1994 |
| EP | 2656904 A1 | 10/2013 |
| GB | 883945 A | 12/1961 |
| GB | 2067216 A1 | 7/1981 |
| WO | 2015082450 A1 | 6/2015 |

OTHER PUBLICATIONS

Van de Beld, A kinetic study of the complete oxidation of ethene, propane and their mixtures on . . . , Chemical Engineering and Processing 34, 1995, p. 469-478.
Rusu et al., Destruction of Volatile Organic Compounds by Catalytic Oxidation, Environmental Engineering and Management Journal, 2003, vol. 2, No. 4, p. 273-302.
Hosseini, M. et al., Promotional effect of gold added to palladium supported on a new mesoporous TiO2 for total oxidation of volatile organic compounds, Catalysis Today, 122 (2007), p. 391-396.

* cited by examiner

Primary Examiner — Timothy C Vanoy
(74) Attorney, Agent, or Firm — Brooks Kushman P.C.

(57) ABSTRACT

Oxygen is effectively removed from hydrocarbon-containing gas streams while minimizing danger of explosion by contacting the gas stream with a catalyst comprising shaped bentonite supports having an outer shell containing catalytic metals gold, and at least one of palladium platinum, rhodium, or iridium.

13 Claims, No Drawings

PROCESS FOR REMOVING OXYGEN FROM A GAS MIXTURE COMPRISING HYDROCARBON AND OXYGEN

CROSS REFERENCE TO RELATED APPLICATIONS

This application is the U.S. National Phase of PCT Appln. No. PCT/EP2016/066317 filed Jul. 8, 2016, which claims priority to German Application No. 10 2015 213 030.4 filed Jul. 13, 2015, the disclosures of which are incorporated in their entirety by reference herein.

BACKGROUND OF THE INVENTION

1. Field of the Invention

The invention relates to a process for removing oxygen from a gas mixture containing hydrocarbon and oxygen, where the oxygen is at least partly converted into carbon dioxide and water in the presence of a catalyst.

2. Description of the Related Art

Gaseous hydrocarbons, for example ethylene, are standard basic chemicals of the chemical industry. Such gases can, for example, contain oxygen as impurity, which is a hindrance in the further use of the hydrocarbon gases and should be removed from the hydrocarbon gases. This can be carried out, for example, by oxidative purification in which the oxygen is reacted with the hydrocarbon to form carbon dioxide and water.

This catalytic, oxidative purification has already been practiced for a long time in the case of gas mixtures having relatively low oxygen contents of less than 5% by volume. Catalysts used for this purpose are palladium or platinum applied to supports composed of aluminum oxide, titanium oxide or silicon oxide. Thus, for example, U.S. Pat. No. 4,093,703 describes the oxidative removal of ethylene from gas mixtures containing up to 1.8% by volume of ethylene. To purify ethylene from crackers, US 2010/0048972 A1 teaches the use of ruthenium catalysts. The gases which are described therein and are to be purified contain oxygen in the ppm range. EP 0 499 087 A1 is concerned with the removal of traces of nitrogen oxide, carbon monoxide and hydrocarbon from oxygen-rich exhaust gases from gas turbines. GB 883,945 describes processes for purifying offgases from the oxidative conversion of ammonia into nitric acid, in which nitrogen oxides and oxygen are removed by addition of unsaturated compounds and sulfides. In Chemical Engineering and Processing 34, 1995, pages 469 to 478, Van de Beld describes the total oxidation of ethene and propane over Pd catalysts having $Al_2O_3$ supports.

In Environmental Engineering and Management Journal, 2003, Vol. 2, No. 4, pages 273 to 302, Rusu discusses the oxidation of ethene using Pd or Pt on $TiO_2$, $Al_2O_3$ or $SiO_2$ supports. In Catalysis Today, 122, (2007), pages 391 to 396, Hosseini recommends Pd and Au on $TiO_2$ as a catalyst for the total oxidation of propene. Catalysts for purifying exhaust gases from diesel engines are known from EP 2 656 904 A1. The catalysts contain a catalytic coating comprising Pt, Pd and a carbon-storing compound such as zeolite and also a further coating comprising Pd and Au.

Catalytic, oxidative purification becomes problematical when the offgases consist predominantly of hydrocarbons and additionally have $O_2$ concentrations of more than 5% by volume. This is because every catalyst requires a particular temperature above which it becomes effective, known as the light-off temperature, in order to achieve catalytic activity. Below this temperature, the catalyst has little effectiveness or is inactive and the reaction takes place only with unsatisfactorily small degrees of conversion. Above the light-off temperature, however, in the case of gas mixtures having relatively high proportions of hydrocarbons and oxygen it is possible for an explosive oxidation reaction and undesirable secondary reactions at the higher temperature level to occur, with the latter being the smaller problem.

Particularly when the gas mixture concerned has a high hydrocarbon concentration and/or high oxygen content and the catalyst requires a high light-off temperature, there is a potential risk of a runaway reaction. In the German patent application of Nov. 20, 2014 with the application number 102014223759.9, it is proposed that the gas mixture to be purified oxidatively be diluted with a gas mixture which has previously been purified. However, this means an additional outlay in terms of apparatus and an increase in the offgas volume. In the German patent application of Nov. 28, 2014 with the application number 102014224470.6, it is proposed that the light-off temperature of a palladium/gold catalyst be decreased by doping with an alkali metal. This means an increased outlay in catalyst production and thus makes the catalyst more expensive.

Problems to be Solved

In the light of this background, it was an object to provide a process for the catalytic oxidative purification of gas mixtures which consist mainly of hydrocarbons and contain considerable proportions of oxygen. Here, the abovementioned problems should be able to be solved, and in particular the formation of by-products should be able to be minimized and explosions should be able to be prevented.

SUMMARY OF THE INVENTION

The invention thus provides a process for removing oxygen from a gas mixture containing hydrocarbon and oxygen, where the oxygen is at least partly converted into carbon dioxide and water in the presence of a catalyst, characterized in that the catalyst employed is a coated catalyst composed of a catalyst support configured as a shaped body, and an outer shell which contains
a) gold and
b) one or more noble metals from the group consisting of palladium, platinum, rhodium, iridium and ruthenium,
which are, independently of one another, present in metallic form, as an alloy, or in the form of salts, and
which does not contain any alkali metals or alkali metal salts.

DETAILED DESCRIPTION OF THE PREFERRED EMBODIMENTS

The gas mixtures preferably contain hydrocarbons having from 1 to 7 carbon atoms, more preferably from 1 to 5 carbon atoms, and most preferably from 1 to 3 carbon atoms. At a pressure of 1 $bar_{abs}$, the hydrocarbons are preferably present in the form of a gas. The hydrocarbons preferably have boiling points of $\leq -20°$ C., more preferably $\leq -40°$ C. and most preferably $\leq -60°$ C., at a pressure of 1 $bar_{abs}$. The hydrocarbons can be saturated or preferably ethylenically unsaturated. Examples of saturated hydrocarbons are methane, ethane, propane, butane or pentane. Examples of ethylenically unsaturated hydrocarbons are propene, butadiene, acetylene, and in particular ethylene.

The hydrocarbons preferably do not bear any functional groups such as alcohol groups or halides, in particular do not contain any functional groups containing oxygen atoms, sulfur atoms, halogen atoms or nitrogen atoms.

The gas mixture to be purified contains one or more hydrocarbons, generally in an amount of at least 50% by volume, preferably from 60 to 95% by volume, and more preferably from 70 to 90% by volume. The gas mixture contains oxygen generally in an amount of up to 10% by volume, preferably from 2 to 10% by volume, and more preferably from 5 to 10% by volume. It is also possible for further gases, for example nitrogen, noble gases, hydrogen, carbon dioxide, carbon monoxide and water vapor, to be present in the gas mixture, generally in an amount of from 0 to 40% by volume. The figures in % by volume are based on the total volume of the respective gas mixture and in each case total 100% by volume.

A coated catalyst which comprises a catalyst support configured as a shaped body together with an outer shell is used as a catalyst. In the case of a coated catalyst, the catalyst support configured as a shaped body is not completely impregnated by the catalytically active components. These are present only in a more or less deep outer region of the shaped body, i.e. present only in the shell, while the region of the support further inside is free of active components.

The customary catalyst shapes, for example spheres, (hollow) cylinders or rings, are known from the prior art. The dimensioning of the shaped catalyst bodies depends on the dimensions of the reactor (reaction tube). Use is generally made of spheres having a diameter of from 3 to 6 mm, cylinders having a diameter of from 3 to 6 mm and a length of from 3 to 6 mm, and hollow cylinders or rings having a diameter of from 3 to 6 mm and a length of from 3 to 6 mm and a wall thickness of from 1.5 to 2 mm. Depending on the dimensions of the catalyst support, the thickness of the shell is preferably from 0.1 to 1 mm.

Suitable support materials are metal oxides such as aluminum oxide, titanium oxide, zirconium oxide and also silicon dioxides, in particular pyrogenically produced metal oxides such as pyrogenic silicon dioxides, and also naturally occurring sheet silicates, in particular bentonite. Bentonite is preferred as support material. The term bentonite is used to refer to clay-containing rocks which contain montmorillonite, which is an aluminum hydrosilicate belonging to the group of phyllosilicates (sheet structure silicates), as a main constituent, generally in an amount of more than 50% by weight.

The production of the shaped bodies from the pulverulent support materials is carried out in a known manner by means of pressing or extrusion, optionally with use of water, binders and lubricants, in order to obtain stable shaped bodies. The shaped bodies obtained in this way are subsequently dried, preferably at a temperature of from 25° C. to 100° C. The drying step is followed by calcination of the shaped bodies. Calcination can be carried out in a furnace under an air atmosphere, optionally under protective gas. In general, the shaped bodies are heated to a temperature of from 500° C. to 1000° C. for this purpose.

The conversion of the shaped catalyst body into an active catalyst occurs by application of the catalytically active components gold and noble metal b) or precursor compounds thereof. To effect loading with gold and the noble metal b), the shaped catalyst bodies can be impregnated with a solution containing a gold salt and a noble metal salt. The impregnation of the shaped catalyst bodies is in each case carried out by means of steeping or spraying the shaped catalyst bodies to form the shell structure. The finished catalyst can subsequently be dried to a residual moisture content of less than 5%. Drying can be carried out in air, optionally under nitrogen as an inert gas.

The gold content of the coated catalyst is from 0.5 to 5% by weight, preferably from 0.5 to 2% by weight, in each case based on the total weight of the coated catalyst. Palladium is preferred as a noble metal component b). The content of the noble metal component b) is from 1 to 10% by weight, preferably from 1 to 3% by weight, in each case based on the total weight of the coated catalyst.

The removal of oxygen from the gas mixture can be carried out in a manner known per se in conventional reactors. Preferred reactors are tube reactors and shell-and-tube reactors. The reactors are charged with the coated catalyst. The gas mixture to be purified is passed through the reactor. The space velocity GHSV of the gas mixture is preferably from 2000 to 4000 $h^{-1}$, more preferably from 3000 to 4000 $h^{-1}$ and most preferably from 3500 to 4000 $h^{-1}$ (GHSV=gas hourly space velocity=quotient of the volume flow of the gas mixture in $m^3/h$ and the reactor volume in $m^3$).

The gas mixture to be purified can be passed through the reactor a number of times, preferably only once. A pressure of preferably from 1 to 20 bar abs. and more preferably from 5 to 15 bar abs. prevails in the reactor. The gas mixture preferably has a temperature of preferably≤200° C., more preferably≤160° C., on entry into the reactor. After the removal of oxygen according to the invention has been carried out, the hydrocarbon gases preferably contain≤0.01% by volume, more preferably≤0.001% by volume and most preferably≤0.0001% by volume (1 ppm by volume), of oxygen, in each case based on the volume of the total gas stream of the purified hydrocarbon gas.

The process of the invention is suitable for purifying any gas mixtures which contain both hydrocarbons and oxygen. These can be offgas streams from chemical processes. The process of the invention is also suitable for purifying product streams from chemical processes, for example for removing oxygen from the recycle gas in vinyl acetate monomer production.

The process for preparing vinyl acetate monomer (VAM) is described, for example, in WO 2015/082450 A1. In the preparation of vinyl acetate monomer, the inerts argon and ethane as main components, in smaller amounts $N_2$ and methane, have to be removed continuously from the recycle gas recirculated into the reactor; otherwise, the reaction to form VAM would cease. In a conventional work-up, from 1 to 25% by volume of the recycle gas is, after vinyl acetate and acetic acid have been separated off, passed to thermal disposal (incineration) in order to remove inerts. In general, this recycle gas contains, after vinyl acetate and acetic acid have been separated off, about 70% by volume of ethylene and about 5% by volume of oxygen. A considerable proportion of ethylene is therefore lost from the process. It is therefore important to recover the ethylene in such a way that it can be recirculated to the VAM process. A prerequisite for this is that the oxygen content in the ethylene to be recirculated be reduced. The removal of oxygen from the unreacted ethylene in the VAM recycle gas system can be carried out by using the process of the invention.

The proportion of the recycle gas which is removed in order to discharge inerts from the recycle process is firstly freed of oxygen using the process of the invention. The proportion of recycle gas which has been treated in this way preferably contains ≤300 ppm by volume of oxygen. This proportion of recycle gas is then freed of carbon dioxide in a recycle gas scrubber. For this purpose, the gas is scrubbed, preferably with an aqueous NaOH solution, in a column.

Particular preference is given to a recycle gas scrub in which the gas is firstly scrubbed with an aqueous potassium carbonate solution in a first column and scrubbed with an aqueous NaOH solution in a second column. The water is subsequently removed from the proportion of recycle gas which has been treated in this way. This can, for example, be carried out by means of molecular sieve drying.

The proportion of recycle gas which has been treated in this way is preferably almost free of oxygen, carbon dioxide and water and contains only ethylene and the inerts methane, ethane, argon and nitrogen. The ethylene proportion can therefore be condensed out by means of fractional low-temperature condensation at a temperature of from −140° C. to −100° C. The ethylene is then fed back to the VAM recycle gas process. The inerts are passed to incineration.

The following examples serve to illustrate the invention:

COMPARATIVE EXAMPLE 1

A supported catalyst made up of a support composed of bentonite in the form of spheres having a diameter of 5 mm, which was impregnated all through with 3.8% by weight of palladium and 3.8% by weight of gold and with 2.5% by weight of potassium acetate, in each case based on the weight of the bentonite support, was used as a comparative catalyst.

EXAMPLE 2

A supported catalyst made up of a support composed of bentonite in the form of spheres having a diameter of 5 mm, which was impregnated with 1.6% by weight of palladium and 0.8% by weight of gold, in each case based on the weight of the bentonite support, in such a way that the active components were present only in a surface layer thickness of about 0.5 mm.

To carry out testing, a flow reactor (reactor length 1200 mm, internal diameter 19 mm) whose temperature was controlled by means of oil was, in each case, charged with the supported catalysts from comparative example 1 or example 2. The gas mixture containing hydrocarbon and oxygen was a recycle gas from a plant for the preparation of vinyl acetate monomer, with a composition obtained, after vinyl acetate monomer and acetic acid had been separated off: 75% by volume of ethylene, 10% by volume of oxygen, 5% by volume of Ar, 0.5% by volume of methane, 1.5% by volume of $CO_2$, 4% by volume of ethane and 4% by volume of $N_2$.

Testing was carried out at a temperature of the gas mixture of 170° C., at a pressure of from 9.5 bar abs. and a space velocity (GHSV) of the gas mixture of 3000 h$^{-1}$. The gas mixtures were in each case analyzed by means of on-line gas chromatography at the outlet of the reactor.

In the case of the supported catalyst of comparative example 1, a proportion of oxygen of 0.3% by volume was measured after exit of the gas mixture from the reactor, corresponding to a 97% conversion of the oxygen.

In the case of the supported catalyst of example 2, no oxygen could be measured after exit of the gas mixture from the reactor, a 100% conversion of the oxygen.

It can thus be seen that the light-off temperature is significantly lower in the process of the invention since, despite a significantly lower noble metal concentration, all of the oxygen has disappeared at 170° C. A decisive factor leading to the low light-off temperature is the concentration of the active components on the surface of the catalyst support (coated catalyst).

The invention claimed is:

1. A process for removing oxygen from a recycle gas mixture containing hydrocarbon and oxygen from the preparation of vinyl acetate monomer, the process comprising:
   separating vinyl acetate and acetic acid from the recycle gas mixture, forming a partially purified recycle gas, contacting the partially purified recycle gas with a coated catalyst to remove oxygen to form an oxygen-depleted recycle gas containing carbon dioxide and water, freeing the oxygen-depleted recycle gas of carbon dioxide, removing water from the oxygen-depleted recycle gas now freed of carbon dioxide, and condensing ethylene by means of fractional low-temperature condensation to form an ethylene recycle stream wherein the coated catalyst comprises bentonite-containing catalyst supports, configured as shaped bodies, having an outer shell comprising the metals
   a) gold, and
   b) one or more metals selected from the group consisting of palladium, platinum, rhodium, and iridium,
      wherein the metals are present in metallic form, as an alloy, in the form of salts, or mixtures thereof,
      wherein the outer shell does not contain any alkali metals or alkali metal salts.

2. The process of claim 1, wherein the thickness of the outer shell of the catalyst support which contains components a) and b) is from 0.1 to 1 mm.

3. The process of claim 2, wherein the content of a) gold is from 0.5 to 5% by weight and the content of the noble metal component b) is from 1 to 10% by weight, in each case based on the total weight of the coated catalyst.

4. The process of claim 3, wherein palladium is present as a noble metal component b).

5. The process of claim 2, wherein palladium is present as a noble metal component b).

6. The process of claim 1, wherein the content of a) gold is from 0.5 to 5% by weight and the content of the noble metal component b) is from 1 to 10% by weight, in each case based on the total weight of the coated catalyst.

7. The process of claim 6, wherein palladium is present as a noble metal component b).

8. The process of claim 1, wherein palladium is present as a noble metal component b).

9. The process of claim 1, wherein the process is carried out at a pressure of from 1 to 20 bar abs., and a temperature of the gas mixture of <200° C.

10. The process of claim 1, wherein the gas mixture contains saturated or unsaturated hydrocarbons having from 1 to 7 carbon atoms.

11. The process of claim 1, wherein the gas mixture contains one or more hydrocarbons in an amount of at least 50% by volume, oxygen in an amount of up to 10% by volume and optionally further gases in an amount of from 0 to 40% by volume, in each case based on the total volume of the gas mixture.

12. The process of claim 1, wherein the gas mixture originates from an offgas stream from a chemical process or from a product stream from a chemical process.

13. The process of claim 1, wherein the ethylene recycle stream is recycled to the process of preparation of vinyl acetate monomer as a reactant.

* * * * *

UNITED STATES PATENT AND TRADEMARK OFFICE
CERTIFICATE OF CORRECTION

PATENT NO. : 10,363,524 B2
APPLICATION NO. : 15/739962
DATED : July 30, 2019
INVENTOR(S) : Willibald Dafinger et al.

Page 1 of 1

It is certified that error appears in the above-identified patent and that said Letters Patent is hereby corrected as shown below:

In the Claims

Column 6, Line 48, Claim 9:
After "gas mixture of"
Delete "<" and
Insert -- $\leq$ --.

Signed and Sealed this
Third Day of March, 2020

Andrei Iancu
*Director of the United States Patent and Trademark Office*